United States Patent
Schaefer et al.

(10) Patent No.: US 11,218,233 B2
(45) Date of Patent: Jan. 4, 2022

(54) METHOD AND SYSTEM FOR ANALYZING A DETERMINATION OF A LINK TRANSMISSION QUALITY INDICATOR AND METHOD AND APPARATUS FOR DETERMINING A LINK TRANSMISSION QUALITY INDICATOR

(71) Applicant: Rohde & Schwarz GmbH & Co. KG, Munich (DE)

(72) Inventors: Andrew Schaefer, Oberhaching (DE); Ernst Flemming, Taufkirchen (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 85 days.

(21) Appl. No.: 16/674,529

(22) Filed: Nov. 5, 2019

(65) Prior Publication Data
US 2021/0135771 A1    May 6, 2021

(51) Int. Cl.
| | |
|---|---|
| *H04B 17/309* | (2015.01) |
| *H04B 17/391* | (2015.01) |
| *H04B 17/373* | (2015.01) |
| *H04L 12/26* | (2006.01) |

(52) U.S. Cl.
CPC ......... *H04B 17/309* (2015.01); *H04B 17/373* (2015.01); *H04B 17/3913* (2015.01); *H04L 43/08* (2013.01)

(58) Field of Classification Search
CPC .............. H04B 17/309; H04B 17/373; H04B 17/3913; H04L 43/08
See application file for complete search history.

(56) References Cited

U.S. PATENT DOCUMENTS

| | | | | |
|---|---|---|---|---|
| 2010/0244881 | A1* | 9/2010 | Ishida | H04L 25/022 324/762.02 |
| 2013/0135482 | A1* | 5/2013 | Lamy-Bergot | H04N 17/00 348/192 |
| 2015/0124901 | A1* | 5/2015 | Xu | H04L 1/0009 375/267 |

FOREIGN PATENT DOCUMENTS

CN         104320805 B      2/2018

OTHER PUBLICATIONS

Cerar, Gregor et al., "Analysis of Machine Learning for Link Quality Estimation", Jožef Stefan Institute, Jamova 39, 1000 Ljubljana, Slovenia, arXiv:1812.08856v3 [cs.NI], Feb. 15, 2019, 16 pages.

* cited by examiner

*Primary Examiner* — Natasha W Cosme
(74) *Attorney, Agent, or Firm* — Westman, Champlin & Koehler, P.A.

(57) ABSTRACT

An approach for determining link transmission quality identifiers is provided. For this purpose, a two-step approach is applied. In a first step, quality indicators are obtained from a black-box device and related signal are obtained and recorded. Based on the recorded data, a model can be established or a neural network can be trained. The generated model or the trained network may be used for determining further quality indicators at any arbitrary point in time.

18 Claims, 4 Drawing Sheets

METHOD AND SYSTEM FOR ANALYZING A DETERMINATION OF A LINK TRANSMISSION QUALITY INDICATOR AND METHOD AND APPARATUS FOR DETERMINING A LINK TRANSMISSION QUALITY INDICATOR

TECHNICAL FIELD

The present invention relates to a method and a system for analyzing the determination of a link transmission quality indicator. The present invention further relates to a method and an apparatus for determining a link transmission quality indicator.

BACKGROUND

Also applicable in principle to any communication link, the present invention and its underlying problem will be hereinafter described in combination with testing a wireless communication link between two communication devices.

In modern communication systems the communication between the communication devices has to fulfill predetermined requirements. For this purpose the quality of a communication link is monitored. In particular, during the process of developing new communication devices or establishing communication links, the properties of a communication link are measured and evaluated.

When measuring the quality of a transmission link, a measuring device may output a specific value, which corresponds to the properties of the transmission link. However, such measuring devices usually do not provide any further information, such as how the quality value is determined. Usually, no additional information of the measured signal is provided. Further, the value for indicating the quality of the transmission link may be provided in a low temporal resolution.

Against this background, a problem addressed by the present invention is to improve the determination of a link transmission quality indicator. In particular, the present invention aims to provide an enhanced and versatile determination of an additional link transmission quality indicator.

SUMMARY

The present invention solves this object by a method and system for analyzing a determination of a link transmission quality indicator, and by a method and an apparatus for determining a link transmission quality indicator with the features of the independent claims. Further advantageous embodiments are subject-matter of the dependent claims.

According to a first aspect, a method for processing link transmission quality indication is provided. The method comprises establishing a link transmission between a first communication device and a second communication device. Further, the method comprises measuring a signal of the communication link and determining a first link transmission quality indicator. The method further comprises storing the determined first link quality indicator in association with the measured signal. Additionally, the method comprises changing a link quality of the established communication link. In particular, the measuring of the signal, the determination of the first link quality indicator and the storing of the determined first link quality indicator is performed by a plurality of different qualities on the transmission link.

According to a further aspect, a system for analyzing a determination of a link transmission quality indicator is provided. The system comprises an analyzer. The analyzer is configured to establish a communication link between a first communication device and a second communication device. The analyzer is further configured to measure a signal of the communication link. Further, the analyzer is configured to store the determined first link quality indicator in association with the measured signal. The analyzer is further configured to change a link quality of the established communication link. In particular, the measuring of the signal, the determination of the first link quality indicator and the storing of the determined first link quality indicator is performed for a plurality of different qualities of the transmission link.

According to a further aspect, a method for determining a link transmission quality indicator is provided. The method comprises measuring a signal of a communication link between a first communication device and a second communication device. The method further comprises determining a second link transmission quality indicator based on prestored recordings of a first link quality indicator and related measured signals.

According to still a further aspect, an apparatus for determining a link transmission quality indicator is provided. The apparatus comprises a measuring device for measuring a signal of a communication link between a first communication device and a second communication device. The method further comprises a processing device for determining second link transmission quality indicators based on prestored recording of first link quality indicators and related measured signals.

The present invention is based on the finding that a conventional analysis of a communication link usually only provides a simple value for specifying a quality of the transmission link. This value usually is provided only with a relative low temporal resolution. Furthermore, a conventional quality indicator usually provides only a simple number without any additional information, e.g. how this value is determined.

Thus, the present invention takes into account this finding and aims to provide an improved determination and processing of link transmission quality indicators. In particular, the present invention aims to provide a further link transmission quality indicator for a more detailed analysis of the transmission link. For this purpose, the additional link transmission quality indicator may be a link transmission quality indicator, which is computed based on a data, which are obtained in advance in association with a conventional first link transmission quality indicator. In other words, the present invention aims to determine a model, for example a mathematical model, based on previously determined link transmission quality indicators and related signals on the transmission link, which corresponds to the respective link transmission quality indicator. After determining such a model, a second link transmission quality indicator can be computed accordingly.

In this way, the second link transmission quality indicator is obtained in a two-step approach. In a first phase, the system is trained. For this purpose, link transmission quality indicators are measured and recorded together with the signals on the transmission link, which lead to the respective first link transmission quality indicators. For this purpose, an analyzing device may be connected to the transmission link, and the analyzing device may provide the respective link transmission quality indicators. In particular, these first link transmission quality indicators may be generated based on any kind of internal algorithm. The provided first link transmission indicators of this device are recorded in association with signals, which are measured on the transmission link at point in time or a period of time when determining the first link transmission quality indicator. In this way, it is possible to obtain a database of first link transmission quality indicators and related signals.

These database may be used for generating a model, wherein the model represents a relationship between signals on the transmission link and corresponding link transmission quality indicators. Any appropriate approach for generating such a model may be applied.

For example, the model may be determined based on a regression method such as a linear or non-linear regression. However, any other approach, for example any kind of estimation approach or the like may be also used for determining the correspondence between the measured signals and the related first link transmission quality indicators. Furthermore, it may be also possible to use artificial intelligence, in particular a neural network, which may be trained based on the determined first link transmission quality indicators and the related signals.

The communication link may be any kind of communication link between two devices. In particular, the communication link may be a wired or a wireless communication link. For example, a wired communication link may be established by a cable connection between the first device and the second device. Alternatively, a wireless communication link may be established by a transmission of radio frequency signals. The communication link may be a unidirectional communication link for transmitting only signals from the first device to the second device or from the second device to the first device. Alternatively, the communication link may be a bidirectional communication link for transmitting signals in both directions, i.e. from the first device to the second device and from the second device to the first device.

The devices may be any kind of devices such as communication devices. For example, a communication link may be established between a mobile communication device, e.g. a mobile phone, and a base station. However, any other kind of communication link between two devices may be possible, too.

For analyzing the quality of the communication link and in particular for determining a first link transmission quality indicator, an analyzing device may be connected to the communication link. In particular, the analyzing device may receive signals from the communication link. Based on the received signal, the analyzing device may determine a first link transmission quality indicator. This first link transmission quality indicator may represent a value for specifying a quality measure relating to the quality of the communication link between the first device and the second device. The first link transmission quality indicator may be determined, for example, by a mathematical formula or the like, which may be stored in the analyzing device. The determination of this first link transmission quality indicator may be performed, for example, based on a predetermined temporal resolution. In other words, the first link transmission quality indicator may be determined in predetermined temporal intervals.

In order to obtain a database for establishing a model of this determination of link transmission quality indicators, the first link transmission quality indicators provided by the analyzing device may be stored. For example, the first link transmission quality indicators may be stored in a random access memory (RAM), a non-volatile memory, a hard disk drive or any other appropriate storage device. In addition to the first link transmission quality indicators, the measured signals on the transmission link between the first device and the second device are stored, too. In particular, the first link transmission quality indicators are stored in association with the related measured signals on the transmission link. The stored signals may be signals relating to a specific point in time corresponding to the point in time when the respective link transmission quality indicator is determined. However, it may be also possible to store a signal sequence relating to a specific period of time.

In order to obtain a reliable database, a number of two or more link transmission quality indicators and related signals are stored, wherein the multiple link transmission quality indicators and the corresponding signals relate to a plurality of different settings. In particular, multiple first link transmission quality indicators and corresponding signals are stored for a plurality of different settings leading to different qualities on the transmission link between the first device and the second device. For this purpose, any kind of modification may be applied. For example, a test signal on the communication link may be altered in order to obtain different configurations leading to different qualities. Furthermore, an additional signal may be added in order to stimulate disturbances such as noise, reflections, echoes, frequency drifts or any other kind of disturbance.

In this way, the obtained database may be used in order to establish a model for the determination of the first link transmission quality indicator. Accordingly, by generating such a model of the generation for the first link transmission quality indicator, this model may be used for an additional determination of link transmission quality indicators. In particular, the determination of further link transmission quality indicators based on the model may be performed with a higher temporal resolution. In this way, it is possible to compute a second link transmission quality indicator for each desired point in time. Hence, the determination of link transmission quality indicators is not limited to the temporal grid of first link transmission quality indicators. Moreover, it might be even possible to determine second link transmission quality indicators on the basis of simulations.

Since the model for the determination of the second link transmission quality indicators is based on the first link transmission quality indicators and the related measurement signals, the results of the model for the second link transmission quality indicators may correspond to the respective first link transmission quality indicators. In other words, a determined second link transmission quality indicator may correspond to the respective first link transmission quality indicator for a point in time, when the first link transmission quality indicator is determined.

Further embodiments of the present invention are subject of the sub-claims and of the following description, referring to the drawings.

In a possible embodiment, the method for analyzing the determination of the link transmission quality indicators comprises a step of determining a second link transmission quality indicator. In particular, the second link quality indicator is determined based on the stored first link quality indicators and the associated measured signals.

Accordingly, the second link transmission quality indicator may represent an indicator for characterizing the link transmission quality corresponding to the first link transmission quality indicator. However, while the first link transmission quality indicator is determined by a black box device, the determination of the second link transmission quality indicator provides a more universal determination of link transmission quality indicators. In particular, the first link transmission quality indicator may be determined based on a fixed timing grid, e.g. providing first link transmission quality indicators at fixed points in time. In contrast to this, the determination of the second link transmission quality indicators may be performed at any arbitrary point in time. For this purpose, it may be sufficient to measure a signal of the transmission link in order to determine a second link transmission quality indicator according to a model, which is determined based on the stored first link transmission quality indicators and the related measured signals.

In a possible embodiment, the second link transmission quality indicator may be determined by applying an estimation algorithm, a regression analysis or a neural network.

As already mentioned above, the first link transmission quality indicators and the related measured signals, which are determined in advance by applying different qualities to the transmission link may serve as a basis for generating a model. This model may be used for determining second link transmission quality indicators. In particular, any kind of scheme for estimating the second link transmission quality indicators based on the previously recorded data may be applied. For example, a linear or a non-linear regression analysis may be performed based on the previously acquired data. Furthermore, artificial intelligence may be also used for a determination of the second link transmission quality indicators based on the previously acquired data. In particular, a neural network may be trained based on the previously acquired data such as the first link transmission quality indicators and the related measured signals.

In a possible embodiment, the method may comprise a step of training the neural network based on the previously acquired data such as the stored first link transmission quality indicators and the associated measured signals. Alternatively, the method may comprise a step of establishing a linear or a non-linear regression analysis based on the stored first link transmission quality indicators and the associated measured signals.

By using the acquired first link transmission quality indicators and the associated measured signals for establishing a model such as a regression analysis or a neural network, the determination of the second link transmission quality indicators may come very close to the determination of the first link transmission quality indicators. Especially, it may be possible to establish such a model that the determination of a second link transmission quality indicator based on a measured signal may lead to a link transmission quality indicator, which is similar or even the same as a first link transmission quality indicator, which is determined on such a signal.

In a possible embodiment, the temporal resolution of the second link transmission quality indicators is higher than the temporal resolution of the first link transmission quality indicators.

The determination of a second link transmission quality indicator may be performed for each or at least almost each desired point in a time. Thus, the determination of a link transmission quality indicator is not limited to a time grid, which is applied to the analyzing device for determining the first link transmission quality indicators. Thus, a more flexible and universal determination of link transmission quality indicators can be achieved.

In a possible embodiment, the establishing the communication link between the first communication device and the second communication device may comprise generating a test signal. In particular, the test signal may be generated by a test signal generator. The changing of the link transmission quality of the established communication link may comprise modifying the generated test signal. Additionally or alternatively, it may be possible to combine the generated test signal with a further signal.

The generated test signal may be any kind of appropriate test signal for testing the communication link, and in particular for evaluating a signal quality of the communication link. By adapting the test signal, it may be possible to simulate disturbances or any other impacts, which may have influence to the quality of the transmission link. For this purpose, it may be possible to directly modify the generated test signal. Further, it may be also possible to use a test signal and to combine this test signal with one or more further signals for stimulating disturbances. For example, a noise signal may be added. Furthermore, it may be also possible to add one or more signals for simulating an echo, a reflection or the like. Furthermore, it may be also possible to simulate a frequency shift, Doppler effects or any other kind of disturbances, which may have impact to the quality of the transmission link.

In a possible embodiment, the generation of the test signal and the measuring of the signal for determining link transmission quality indicators may be performed in a common housing. Alternatively, it may be possible that the device for generating the test signals and the device for measuring the signals may be communicatively coupled with each other. In particular, the devices may be synchronized with each other by a remote connection or the like.

In a possible embodiment, the measuring of the signals may be performed by an oscilloscope. However, it is understood, that any other kind of appropriate measuring device may be also possible. For example, the measuring may be performed by a network analyzer, a transient recorder or any other kind of measuring device for measuring a number of one or more signals, in particular for measuring signal sequences.

In a possible embodiment of the method for determining a link transmission quality indicator, the determination of the second link transmission quality indicator may be performed by means of a regression analysis or a neural network. In particular, the determination of the second link transmission quality indicator may be determined by a neural network, which is trained based on the recordings of the first link transmission quality indicators and the related measurement signals.

In a possible embodiment, the determination of the second link transmission quality indicator may determine a second link transmission quality indicator, which is time-correlated with the measured signal. Accordingly, the determined second link transmission quality indicator may be associated to a specific point in a time of the measured signal.

In a possible embodiment, the method may comprise providing a time sequence of the measured signal. For example, the time sequence may be provided by displaying a signal curve or signal waveform. Alternatively, it may be possible to provide the time sequence of the measured signal in any other appropriate manner, for example as time variant measurement values. In this case, it may be possible to provide time-correlated second link transmission quality indicators to the provided time sequence of the measured signal. For example, the determined second link transmission quality indicators may be also provided as a signal curve, which is displayed in association with a signal curve of the measured signal. Alternatively, it may be possible to provide the determined second link transmission quality indicators in association with the displayed signal curve/waveform in any other appropriate manner. For example, it may be possible to provide a cursor, which can be moved around the signal waveform/curve of the measured signal, wherein a related second link transmission quality indicator is provided for the measured signal at the position of the cursor. However, it is understood that any other appropriate manner for providing the correspondence of the measured signal and the determined second link transmission quality indicators may be also possible.

With the present invention it is therefore now possible to obtain link transmission quality indicators for almost any point in time. It is for this purpose that in a first step a data acquisition is performed. During this data acquisition, the transmission quality of the transmission link is varied, and multiple measurements are performed for acquiring a signal on the transmission link and related link transmission quality indicators. After acquiring these data, a model may be established for determining or estimating a link transmission quality indicator. In a second step, this model may be used for determining a link transmission quality indicator of a signal on the transmission link. In this way it is possible to determine a link transmission quality indicator for each point in time. In particular, it is possible to acquire a measurement signal on the transmission link at any arbitrary point in a time and to determine a link transmission quality indicator based on such a measured signal. In this way, the determination of the link transmission quality indicator, which is determined based on such a model, is not limited to a particular temporal resolution or the like. Thus, a more flexible and versatile determination of link transmission quality indicators is achieved.

BRIEF DESCRIPTION OF THE DRAWINGS

For a more complete understanding of the present invention and advantages thereof, reference is now made to the following description taking in conjunction with the accompanying drawings. The invention is explained in more detail below using exemplary embodiments, which are specified in the schematic figures and the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In the drawings, same, functionally equivalent and identical operating elements, features and components are provided with same reference signs in each case, unless stated otherwise.

DETAILED DESCRIPTION OF THE DRAWINGS

Figure 1:
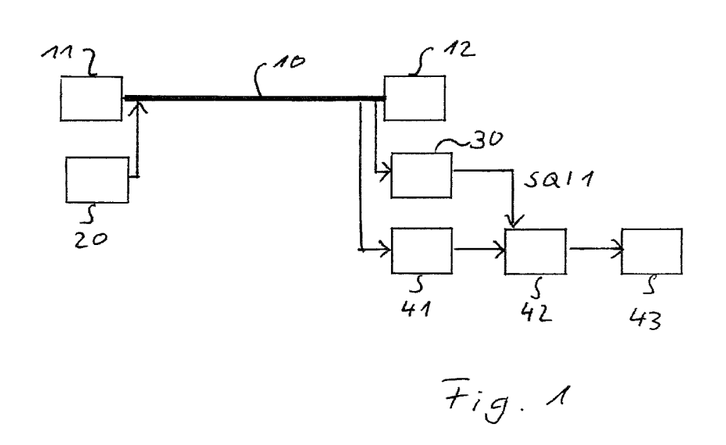
FIG. 1: shows a block diagram of an embodiment of a system for analyzing the determination of link transmission quality indicators.

FIG. 1 shows a block diagram of a test system according to an embodiment. For example, it may be possible to evaluate a communication link 10 between a first device 11 and a second device 12. The first device 11 and the second device 12 may be, for example, communication devices. Thus, transmission link 10 may be a transmission link between a first communication device 11 and a second communication device 12. For example, the first communication device 11 may be a mobile communication device such as a mobile phone, a radio or the like. Accordingly, the second communication device 12 may be a communication partner of the first communication device 11, for example a base station, a further radio, etc. However, it is understood, that the present invention is not limited to the above mentioned examples of communication devices 11, 12. Furthermore, any other kind of devices 11, 12 may be possible, wherein a communication link 10 can be established between the first device 11 and the second device 12.

The transmission link 10 may be a wireless communication link or a wired communication link. Accordingly, the communication link 10 may be realized, for example, by a radio frequency transmission. Alternatively, the communication link 10 may be a wired communication link, which can be realized, for example by a cable connection such a wired connection or a connection using optimal fibers. Furthermore, any other kind of transmission link 10 between the first device 11 and the second device 12 may be possible. The transmission link 10 may be a unidirectional transmission link for transmitting signals only in one direction from the first device 11 to the second device 12 or from the second device 12 to the first device 11. Alternatively, the transmission link 10 may be a bidirectional transmission link for transmitting signals in both directions simultaneously.

In order to evaluate the transmission link 10, one or more parameters for specifying the quality of the transmission link 10 can be determined. Such a quality parameter may specify, for example, a signal to noise ratio, a parameter for characterizing the ratio between the transmitted and the received power, a parameter for characterizing a phase shift or the like, or any other kind of parameter for characterizing one or more properties of the transmission link 10.

In order to evaluate the quality of the transmission link, an analyzing device 30 for measuring the transmission link and determining a first link transmission quality indicator SQI1 may be connected to the transmission link 10. Accordingly, analyzing device 30 may measure a signal on the transmission link 10 and output a corresponding first link transmission quality indicator SQI1. In particular, the detailed scheme for determining such a first link transmission quality indicator SQI1 may be not known or at least not known in detail. Furthermore, the time interval for determining the first link transmission quality indicators SQI1 may be fixed or predetermined by the setting of device 30. In other words, device 30 for determining the first link transmission quality indicator SQI1 may be something like a black box, which receives/measures a signal of the transmission link 10 and outputs a value for characterizing a quality of the transmission link 10.

In order to obtain a measure for the quality of the transmission link for a specific event or a specific point in a time, it would be desirable to have an approach for obtaining a more detailed determination of link transmission quality indicators, in particular for obtaining link transmission quality indicators for any point in time during a measurement.

For this purpose, a two-step approach is provided. In particular, this two-step approach comprises a learning phase for characterizing the determination of the first link transmission quality indicators by device 30. Further, the two-step approach comprises a working/evaluation phase, in which a second link transmission quality indicator SQI2 can be determined for any point in time during the measurement.

During the first phase, the quality of the transmission link 10 is varied, and a plurality of measurements are performed for multiple different quality settings of the transmission link. This first phase may be performed by an arrangement of an analyzer as illustrated in FIG. 1. For example, a signal generator 10 may be provided. Signal generator 10 may generate a signal and provide this signal to transmission link 10. Accordingly, device 30 may measure the signal on transmission link 10 and determine a corresponding first link transmission quality indicator SQI1. Further to this, a measuring device 41 can be provided for measuring the signal on transmission link 10. Thus, measuring device 41 may measure the signal on a transmission link 10, which leads to a corresponding first link transmission quality indicator SQI1. In this way, the determined first link transmission quality indicator SQI1 may be recorded together with the corresponding measured signal. For example, the first link transmission quality indicator SQI1 and the related measured signal may be stored in a memory 42. Memory 42 may be any kind of memory such as a random access memory, a non-volatile memory, a hard disk drive or the like. In particular, the first link transmission quality indicator SQI1 and the related measured signal may be stored in form of a database or the like. However, any other appropriate manner for storing the data may be possible, too.

In order to vary the quality of the transmission link 10 or at least to simulate a different quality of transmission link 10, any kind of appropriate scheme may be applied. For example, the signal which is generated by a signal generator 10 may be modified accordingly. In this way, variations of the amplitude, the frequency or the like may be simulated. Additionally, or alternatively, it may be also possible to simulate a variation of the quality by adding a further signal to the signal generated by a signal generator 20. For this purpose, an additional signal generator may be included in signal generator 20, or the additional signal generator may be realized as a separate device. Thus, the signal of signal generator 20 and the additional signal may be combined together in order to simulate disturbances or variations in the quality of the transmission link 10. In this way, an echo, reflections, phase shifts, Doppler effects or the like may be simulated. However, it is understood, that any other kind of disturbances may be also simulated and applied to transmission link 10 in order to vary the quality of transmission link 10.

After recording first link transmission quality indicators SQI1 and corresponding signals for a plurality of different qualities, a model for the determination of the first link transmission quality indicator SQI1 may be generated. For example, the recorded data may be provided to a training device 43. This training device 43 may read the recorded data of the first link transmission quality indicators SQI1 and the corresponding signals and generate a model for the determination of the first link transmission quality indicator SQI1. For example, the model may be based on a regression approach, in particular a linear or a non-linear regression. However, any other kind of estimation for determining link transmission quality indicators according to the recorded data may be possible.

In particular, it may be also possible to determine the relationship between the measured signals and the corresponding first link transmission quality indicators SQI1 based on artificial intelligence. For example, a neural network may be used. Thus, the neural network may be trained based on the recorded data stored in memory 42.

After finishing the training of the neural network or determining any other kind of model for determining link transmission quality indicators, it may be possible to determine additional second link transmission quality indicators. In particular, the neural network or the model may be used for determining a second link transmission quality indicator according to a signal measured on transmission link 10.

Figure 2:
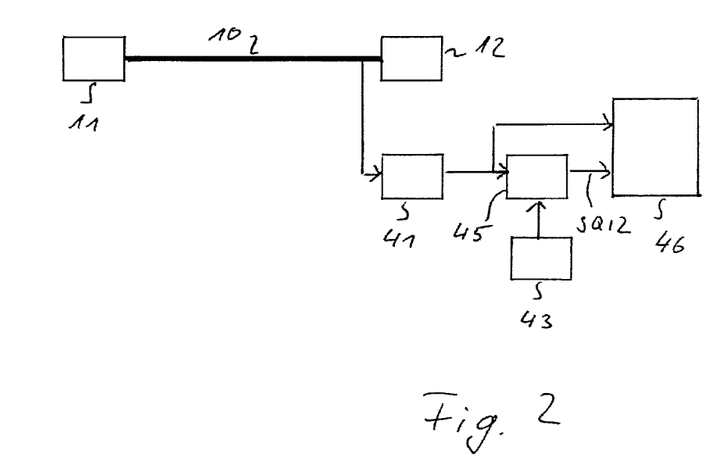
FIG. 2: shows a block diagram of an apparatus for determining a link transmission quality indicator according to an embodiment.

FIG. 2 shows a configuration of a test arrangement in a second phase. In this second phase, the determination of the model or the training of the neural network for determining second link transmission quality indicators SQI2 has been completed, at least in part. It may be possible that the determination of the model or the training of the neural network may be further improved by additional measurements at any later point in time.

In this second phase, measuring device 41 may measure a signal on transmission link 10. The measured signal may be provided to a processing device 45 for determining second link transmission quality indicators SQI2. Processing device 45 may apply the model, which has been determined in advance or the neural network, which has been trained before based on the determined first link transmission quality indicators and the related measured signals. Accordingly, processing device 45 may be in the position to provide second link transmission quality indicators. In particular, the result of the determination of the second link transmission quality indicators SQI2 may be similar to the determination of the first link transmission quality indicators by device 30. In other words, when same signals of transmission link 10 are provided to analyzing device 30 and to processing device 45, same or at least almost same link transmission quality indicators are obtained. However, the determination of the second link transmission quality indicators SQI2 may be performed at any arbitrary point in time. Thus, the determination of the second link transmission quality indicators is not limited to a particular time grid or to points in time, which are limited by the configuration of the analyzing device 30. In this way, the temporal resolution of the determination for second link transmission quality indicators SQI2 is higher than the temporal resolution of the determination for the first link transmission quality indicators SQI1. In particular, processing device 45 may provide second link transmission quality indicators SQI2, which are time-correlated to the measured signals.

For example, measurement device 41 for measuring the signals on the transmission link 10 may be an oscilloscope. However, any other kind of device for measuring the signals on transmission link 10 may be also possible. Furthermore, measurement device 41 may be a vector analyzer, a transient recorder or the like.

The determined second link transmission quality indicators SQI2 may be recorded together with the measured signal in any appropriate manner. In particular, the measured signal and the corresponding second link transmission quality indicator SQI2 may be recorded in time-correlated manner. Furthermore, the determined link transmission quality indicators, in particular the determined second link transmission quality indicator SQI2 may be provided to a user in any appropriate manner. For example, the results of the determination for the second link transmission quality indicator may be displayed on a display 46.

Figure 3:
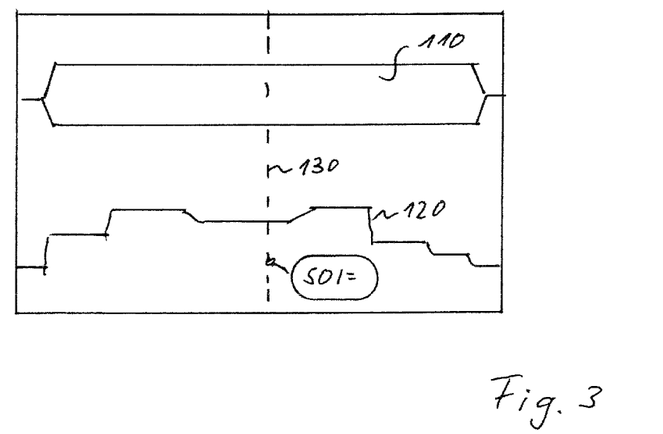
FIG. 3: shows a schematic illustration for representing link transmission quality indicators according to an embodiment.

FIG. 3 illustrates a schematic representation for providing link transmission quality indicators in relationship with a measured signal. For example, a representation 110 of the measured signal may be provided on a display. The representation 110 of the signal may be provided, for example by a signal curve or a signal waveform, which is represented in the upper row of the diagram in FIG. 3. Further to this, the determined second link transmission quality indicators may be also represented as a curve 120 together with the representation 110 of the signal waveform of the measured signal. This is represented, for example in the lower row in the diagram of FIG. 3.

Further to this, it may be also possible to provide a curser 130, which can be moved around the represented signal waveform of the measured signal. In such an example, it may be possible to output the corresponding second link transmission quality indicators SQI2 for the signal, which is indicated by the position of the curser 130. However, any other manner for providing determined second link transmission quality indicator may be possible, too. In particular, the determined second link transmission quality indicator may be provided in a temporal correlation with the measured signal.

Figure 4:
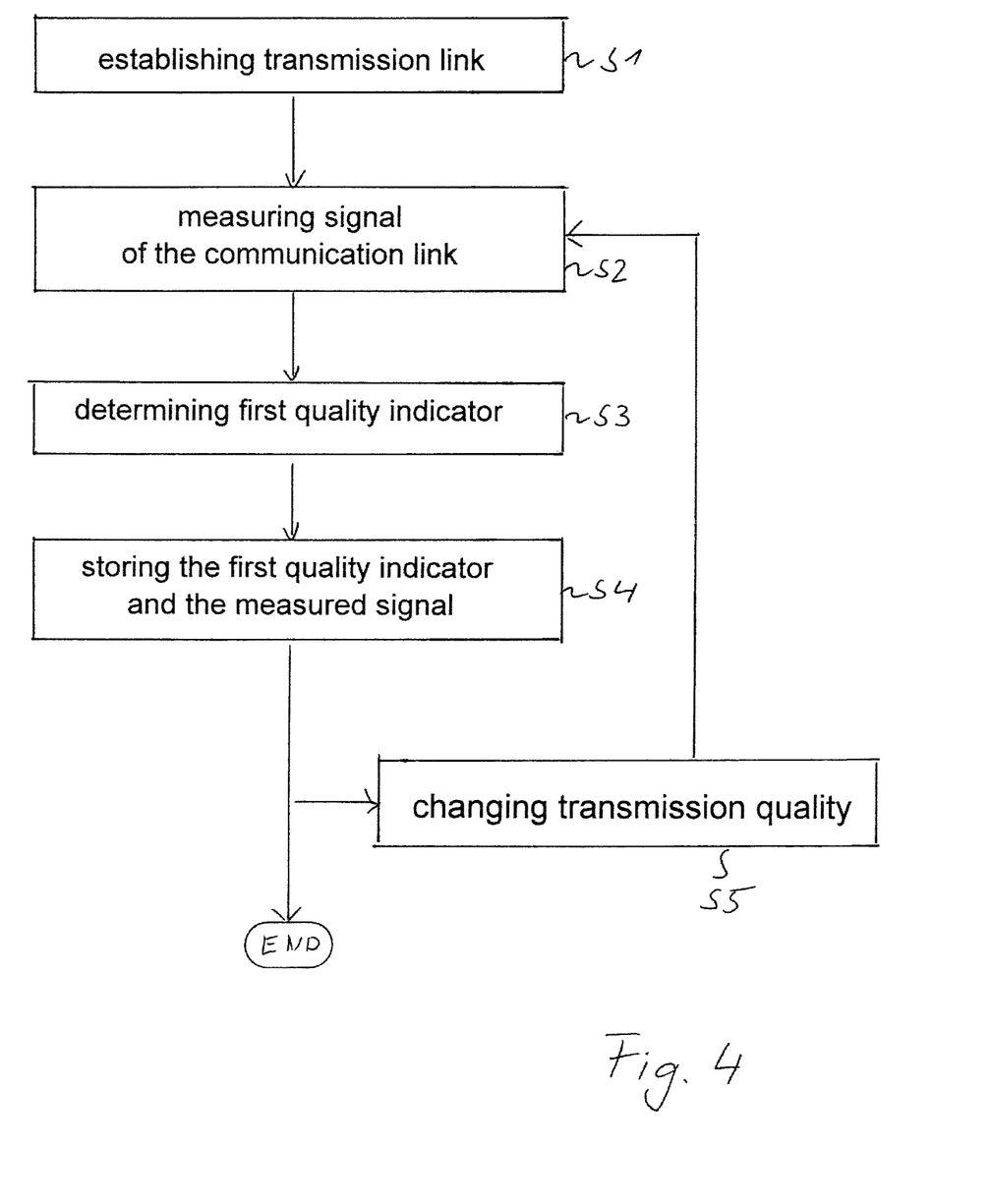
FIG. 4: shows a flow diagram of a method for analyzing the determination of link transmission quality indicators according to an embodiment.

FIG. 3 shows a flow diagram of a method for analyzing the determination of link transmission quality indicators. Such a method may be applied for acquiring data in order to establish a model or a drain in neural network according to the above-mentioned first phase.

In a first step S1, a transmission link 10 may be established between a first communication device 11 and a second communication device 12. In step S2, a signal of the communication device 10 may be measured, and a first link transmission quality indicator SQI1 may be determined in step S3. In step S4, the determined first link transmission quality indicator may be stored in association with the measured signal. In a step S5, the link quality of the established communication link 10 may be changed, and subsequently, a further measuring of signal of the communication link 10 and a determination of the link transmission quality indicator may be performed. In this way, a plurality of link transmission quality indicators and corresponding measured signals may be acquired and stored for different qualities of the transmission link.

Based in the acquired and stored data, in particular the stored first link transmission quality indicators and the related measured signals, a model may be generated or a neural network may be trained. Accordingly, a second link transmission quality indicator SQI2 can be determined based on the model.

Figure 5:
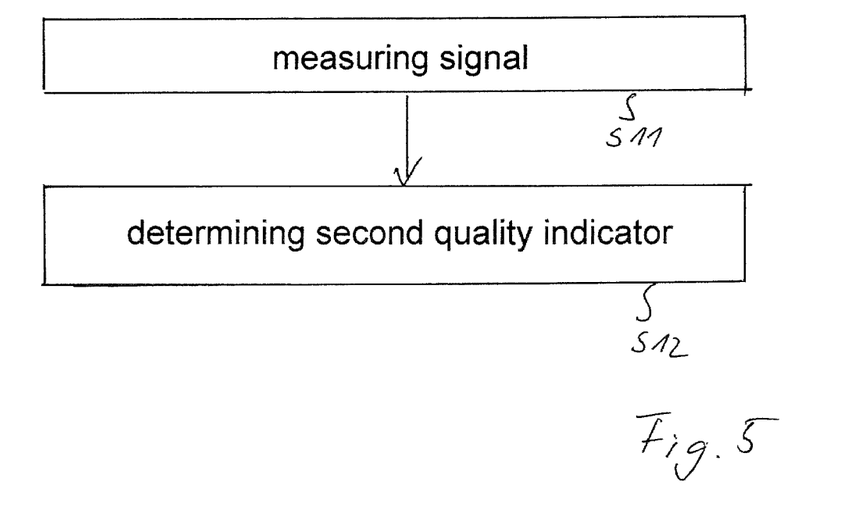
FIG. 5: shows a flow diagram of a method for determining a link transmission quality indicator according to an embodiment.

FIG. 5 shows a flow diagram of a method for determining a second link transmission quality indicator. In particular, this method corresponds to the method according to the second phase, i.e. the determination of second link transmission quality indicators based on a trained neural network or an established model.

Accordingly, in a step S11, the signal of a communication link 10 between a first communication device 11 and a second communication device 12 is measured. Accordingly, in a second step S12, a second link transmission quality indicator SQI2 is determined. The second link transmission quality indicator is determined based on the model or the neural network, which is trained according to the prestored recordings of first link transmission quality indicators and related measure signals.

Summarizing, the present invention relates to the determination of identifiers for specifying the quality of a communication link. For this purpose, a two-step approach is applied. In a first step, quality indicators and related signal are obtained and recorded. Based on the recorded data, a model can be established or a neural network can be trained. The generated model or the trained network may be used for determining further quality indicators at an arbitrary point in time.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 10 transmission link
11, 12 communication devices
20 signal generator
30 analysing device
41 measurement device
42 memory
43 training device
45 processing device
46 display
110 waveform of a measurement signal
120 waveform of a link transmission quality indicator
130 cursor

The invention claimed is:
1. A method for analyzing a determination of a link transmission quality indicator, the method comprising:

establishing a transmission link between a first communication device and a second communication device;
measuring a signal of the communication link by an oscilloscope;
determining a first link transmission quality indicator;
storing the determined first link transmission quality indicator in association with the measured signal; and
changing a transmission quality of the established communication link,
wherein the measuring of the signal, the determination of the first link transmission quality indicator and the storing of the determined first link transmission quality indicator and the measured signal is performed for multiple different transmission qualities of the transmission link,
the method further comprises determining a second link transmission quality indicator based on the stored first link transmission quality indicators and the associated measured signals, wherein the determination of the second link transmission quality indicator determines a second link transmission quality indicator which is time-correlated with the measured signal of the transmission link.

2. The method of claim 1, wherein determining the second link transmission quality indicator comprises applying an estimation algorithm, a regression analysis or a neural network.

3. The method of claim 2, comprising training the neural network based on the stored first link transmission quality indicators and the associated measured signals, or setting a linear or non-linear regression based on the stored first link transmission quality indicators and the associated measured signals.

4. The method of claim 1, wherein a temporal resolution of the second link
transmission quality indicator is higher than a temporal resolution of the first link
transmission quality indicator.

5. The method of claim 1, wherein establishing the communication link comprises generating a test signal by a test signal generator, and
changing the link transmission quality of the established communication link
comprises modifying the test signal and/or combining the generated test signal with a further signal.

6. The method of claim 5, wherein the generation of the test signal and the measuring of the signal is performed in a common housing.

7. A method for determining a link transmission quality indicator, the method
comprising:
measuring a signal of a communication link between a first communication device and a second communication device by an oscilloscope; and
determining a second link transmission quality indicator based on pre-stored recordings of first link transmission quality indicators and related measured signals,
wherein the determination of the second link transmission quality indicator determines a second link transmission quality indicator which is time-correlated with the measured signal of the transmission link.

8. The method of claim 7, wherein the determination of the second link transmission quality indicator is performed by means of a regression analysis or a neural network which is trained based on the recordings of the first link transmission quality indicators and the related measured signals.

9. The method of claim 7, comprising providing a time sequence of the measured signal and time-correlated second link transmission quality indicators.

10. A system for analyzing a determination of a link transmission quality indicator, the system comprising:
an analyzer comprising an oscilloscope, wherein said analyzer is adapted to establish a communication link between a first communication device and a second communication device, measure a signal of the communication link by said oscilloscope, and store the determined first link transmission quality indicator in association with the measured signal, changing a link transmission quality of the established communication link,
wherein the measuring of the signal, the determination of the first link transmission quality indicator and the storing of the determined first link transmission quality indicator and the measured signal is performed for multiple different transmission qualities of the transmission link,
wherein the analyzer is configured to determine a second link transmission quality indicator based on the stored first link transmission quality indicators and the associated measured signals, and
wherein the analyzer is configured to provide the second link transmission quality indicator which is time-correlated with the measured signal.

11. The system of claim 10, wherein the analyzer is configured to apply an estimation algorithm, a regression analysis or a neural network for determining the second link quality.

12. The system of claim 11, wherein the analyzer is configured to train the neural network based on the stored first link transmission quality indicators and the associated measured signals, or set a linear or non-linear regression based on the stored first link transmission quality indicators and the associated measured signals.

13. The system of claim 10, wherein a temporal resolution of the second signal quality indicator is higher than a temporal resolution of the first signal quality indicator.

14. The system of claim 10, comprising a signal generator for generating a test signal,
wherein the signal generator is configured to change the link transmission quality of the established communication link by modifying the test signal and/or combining the generated test signal with a further signal.

15. The system of claim 14, wherein the signal generator and the analyzer are arranged in a common housing, or the signal generator and the analyzer are communicatively connected with each other.

16. An apparatus for determining a link transmission quality indicator, the apparatus comprising:
a measuring device comprising an oscilloscope for measuring a signal of a communication link between a first communication device and a second communication device; and
an analyzer for determining a second link transmission quality indicator based on pre-stored recordings of first link transmission quality indicators and related measured signals,
wherein the analyzer is configured to provide the second link transmission quality indicator which is time-correlated with the measured signal.

17. The apparatus of claim 16, wherein the analyzer is configured to the determine the second link transmission quality indicator by of a regression analysis or a neural network which is trained based on the recordings of the first link transmission quality indicators and the related measured signals.

18. The apparatus of claim 16, comprising a display for providing a time sequence of the measured signal and time-correlated second link transmission quality indicators.

\* \* \* \* \*